United States Patent
Li

(10) Patent No.: US 11,438,308 B2
(45) Date of Patent: Sep. 6, 2022

(54) METHOD AND DEVICE FOR SECURELY DISPLAYING DATA

(71) Applicant: TENDYRON CORPORATION, Beijing (CN)

(72) Inventor: Dongsheng Li, Beijing (CN)

(73) Assignee: Tendyron Corporation, Beijing (CN)

( * ) Notice: Subject to any disclaimer, the term of this patent is extended or adjusted under 35 U.S.C. 154(b) by 380 days.

(21) Appl. No.: 16/643,471

(22) PCT Filed: Jul. 10, 2018

(86) PCT No.: PCT/CN2018/095186
§ 371 (c)(1),
(2) Date: Feb. 28, 2020

(87) PCT Pub. No.: WO2019/042023
PCT Pub. Date: Mar. 7, 2019

(65) Prior Publication Data
US 2021/0006538 A1    Jan. 7, 2021

(30) Foreign Application Priority Data
Aug. 28, 2017  (CN) .......................... 201710753841.3

(51) Int. Cl.
*H04L 29/06* (2006.01)
*H04L 9/40* (2022.01)
(Continued)

(52) U.S. Cl.
CPC ......... *H04L 63/0227* (2013.01); *G06Q 20/02* (2013.01); *G06Q 20/38* (2013.01); *G06Q 20/382* (2013.01)

(58) Field of Classification Search
CPC ..... H04L 63/0227; H04L 9/40; H04L 63/101; H04W 12/088
See application file for complete search history.

(56) References Cited

U.S. PATENT DOCUMENTS

| 10,701,545 B2 * | 6/2020 | Jiang ..................... H04W 8/005 |
| 2003/0132944 A1 * | 7/2003 | Smith ....................... G06F 3/14 345/581 |

(Continued)

FOREIGN PATENT DOCUMENTS

| CN | 101707652 A | 5/2010 |
| CN | 102073802 A | 5/2011 |

(Continued)

OTHER PUBLICATIONS

Nunnally et al., "P3D: A parallel 3D coordinate visualization for advanced network scans", 2013 IEEE International Conference on Communications (ICC), Date of Conference: Jun. 9-13, 2013.*

(Continued)

*Primary Examiner* — Morshed Mehedi
(74) *Attorney, Agent, or Firm* — Martin & Ferraro, LLP

(57) ABSTRACT

A method and device for securely displaying data are displayed. The method includes the following. A security display state is entered after an instruction used for starting the security display state is received. A current data packet to be displayed is obtained. If a display address includes a security display address, security data corresponding to the security display address is obtained from current data to be displayed. The security data is securely processed. The security data is displayed at the security display address. A security processing result of the security data is obtained. The security display address is a fixed address.

15 Claims, 1 Drawing Sheet

(51) Int. Cl.
*G06Q 20/02* (2012.01)
*G06Q 20/38* (2012.01)

(56) References Cited

U.S. PATENT DOCUMENTS

| | | | |
|---|---|---|---|
| 2009/0128859 A1* | 5/2009 | Daos | H04N 1/32203 358/3.28 |
| 2015/0254667 A1* | 9/2015 | Ninomiya | G06F 21/31 705/44 |
| 2016/0034173 A1* | 2/2016 | Ninomiya | G06F 3/0346 715/773 |
| 2018/0260186 A1* | 9/2018 | Zhu | H04L 67/1095 |

FOREIGN PATENT DOCUMENTS

| | | | | |
|---|---|---|---|---|
| CN | 103200176 A | 7/2013 | | |
| CN | 103996117 A | 8/2014 | | |
| JP | 7014894 B2 * | 2/2022 | | G06Q 20/02 |
| WO | WO-0223316 A2 * | 3/2002 | | G06F 3/021 |
| WO | WO 2016036418 A1 | 3/2016 | | |

OTHER PUBLICATIONS

International Search Report dated Sep. 27, 2018 for PCT/CN2018/095186 with English Translation.
Written Opinion of the International Search Authority dated Sep. 27, 2018 for PCT/CN2018/095186 with English Translation.

* cited by examiner

METHOD AND DEVICE FOR SECURELY DISPLAYING DATA

CROSS-REFERENCE TO RELATED APPLICATIONS

This application is a US national application of PCT application no. PCT/CN2018/095186 filed on Jul. 10, 2018, which claims priority to Chinese Patent Application No. 201710753841.3, filed on Aug. 28, 2017 by Tendyron Corporation, all of which are incorporated herein by reference.

TECHNICAL FIELD

The present disclosure relates to a field of security payment, and more particularly, to a method and device for securely displaying data.

BACKGROUND

With the rapid development of information technologies, online payment is popularized. However, there are many security risks in the online payment. For example, in a process of the payment using a mobile terminal, user transaction data is displayed on the screen to be confirmed by the user to implement the transaction. However, hackers may hijack a main processor (for example, CPU). When transaction data to be displayed is processed, tampered transaction data is sent to a security module of a mobile terminal for signature, and the user's original transaction data is sent to a display module for display. The user confirms the transaction data displayed by the display module, but the tampered data is signed by the security module. Therefore, the mobile terminal does not process the original transaction data, but the tampered transaction data. The data signed by the mobile terminal is not the data displayed on the screen (i.e., "what you see is not what you sign for"). That is, it is difficult to guarantee that the signed data is the transaction data displayed by the display module during the payment by the mobile terminal, which makes the online payment unsafe.

SUMMARY

The present disclosure provides a method for securely displaying data. The method includes: entering a security display state after receiving, by a control filter module, an instruction for starting the security display state; obtaining, by the control filter module, a current data packet to be displayed, the current data packet to be displayed at least including a display address and current data to be displayed corresponding to the display address; in a case that the display address includes a security display address, the obtaining, by the control filter module, security data corresponding to the security display address from the current data to be displayed and sending the security data to a security module for securely processing, the security display address being a fixed address; controlling, by the control filter module a display module to display the security data at the security display address; and obtaining, by the control filter module a security processing result of the security data.

Embodiments of another aspect of the present disclosure provide a device for securely displaying data. The device at least includes: a control filter module, a main processor, a display module and a security module. The control filter module is configured to enter a security display state after receiving an instruction for starting the security display state. The control filter module is configured to obtain a current data packet to be displayed, the current data packet to be displayed at least including a display address and current data to be displayed corresponding to the display address. The control filter module is further configured to obtain security data corresponding to the security display address from the current data to be displayed in a case that the display address includes the security display address, and send the security data to the security module, the security display address being a fixed address; control the display module to display the security data at the security display address, the security data being used to a signature operation of the security module after the security module receives a confirmation instruction of the security data; and obtain a security processing result of the security data.

BRIEF DESCRIPTION OF THE DRAWINGS

In order to elaborate the technical solution of the embodiments of the present disclosure, drawings used in the description of the embodiments are briefly introduced below. Obviously, the drawings in the following description are only some embodiments of the present disclosure. Those of ordinary skill in the art can obtain other drawings according to these drawings without inventive works.

DETAILED DESCRIPTION

In the related art, in order to ensure the security of the online payment, a display screen of a KEY (USBKEY or audio KEY) connected to a terminal can be used to display the user's transaction data, and physical keys provided on the KEY can be used to confirm the transaction information. Since the attacker cannot hijack the CPU of the KEY and cannot tamper with the transaction data, the transaction data displayed on the KEY is the real transaction data, which guarantees "what you see is what you signed for". Although this method guarantees "what you see is what you signed for", the operation with the KEY is complicated and the user is required to carry the audio KEY at any time, which brings great inconvenience to the user.

Therefore, a method for guaranteeing "what you see is what you signed for" on a terminal without using a KEY is urgently required.

Figure 1:
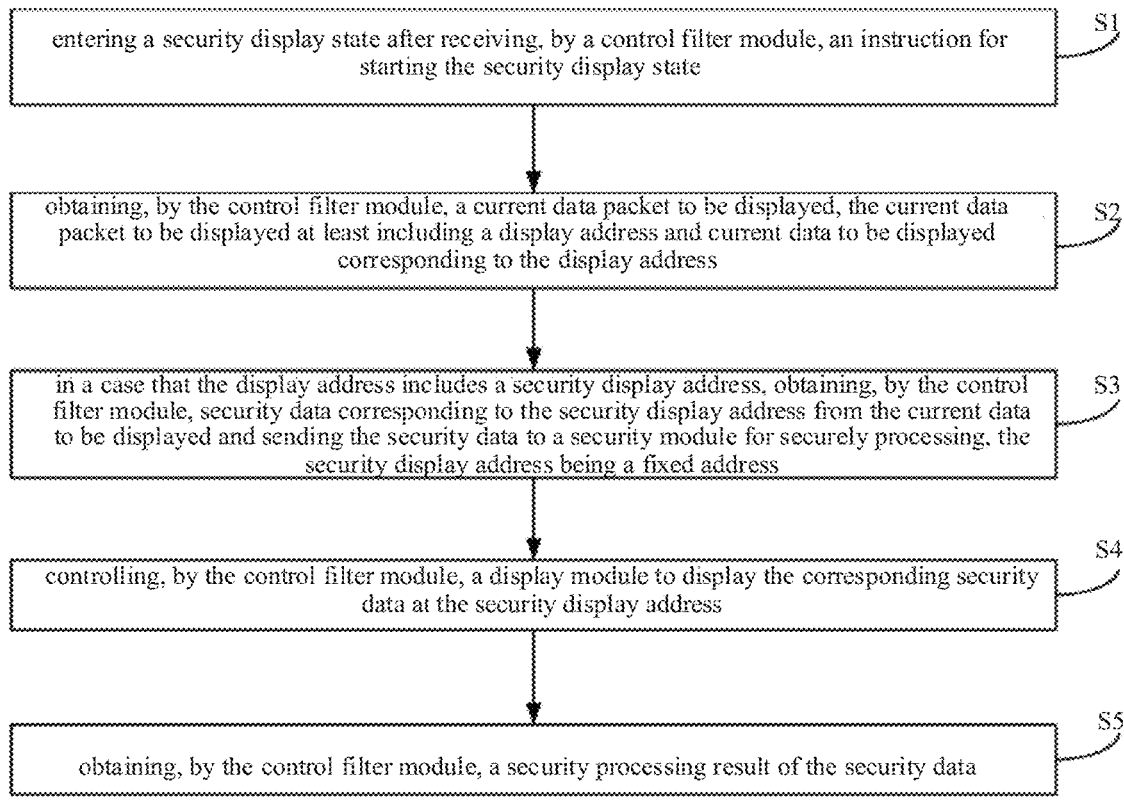
FIG. 1 is a flowchart illustrating a method for securely displaying data according to embodiments of the present disclosure.

FIG. 1 is a flowchart illustrating a method for securely displaying data according to embodiments of the present disclosure. As illustrated in FIG. 1, the method for securely displaying data according to embodiments may mainly include the followings (S1-S5).

At block S1, a control filter module enters a security display state after receiving an instruction for starting the security display state.

In embodiments, the instruction for starting the security display state may be an application initialization instruction. For example, the security display state is started when launching the application program. In embodiments, the instruction for starting the security display state may be a signature instruction. For example, the security display state is started after receiving the signature instruction. In embodiments, the instruction for starting the security display state may be an instruction to prepare a secure computing environment. Certainly, any instruction in an instruction stream before the security data (e.g., transaction account or transaction amount) is securely processed (e.g., signed) may be used as an instruction for starting the security display state, which is not specifically limited in embodiments, as long as the instruction for starting the security display state is within the protection scope of the present disclosure.

At block S2, the control filter module obtains a current data packet to be displayed. The current data packet to be displayed at least includes a display address and current data to be displayed corresponding to the display address.

Execution subject in embodiments is the control filter module of the terminal (for example, a personal computer, a mobile phone, and an IPAD). In addition to the control filter module, the terminal may further include a main processor, a security module, and a display module. Different from an existing terminal, the main processor in embodiments does not directly communicate with the security module and the display module, but directly communicates with the control filter module.

In embodiments, the control filter module may be integrated in a graphics card or an image processing chip (GPU) of the terminal. Certainly, the function of the control filter module may be implemented by a separate chip, or by integrating with the security module on a chip, and which is not limited in embodiments as long as implementations of the function of the control filter module in embodiments are within the protection scope of the present disclosure.

In embodiments, the display address is a physical address of a storage unit. The data to be displayed on a display screen needs to be stored by the storage unit. The current data to be displayed corresponding to the display address is stored in the storage unit at the display address. It should be noted that the storage unit may be a separate storage unit of the graphics card or a storage unit shared with the main processor. In an example, a part of the storage unit is in a video memory, and the other part of the storage unit is shared with the main processor, which is not specifically limited in embodiments.

As a possible implementation of embodiments, before the control filter module obtains the current data packet to be displayed, the main processor determines whether the current data packet to be displayed contains the security data. In specific applications, the main processor can determine whether the data to be displayed contains data conforming to a preset format. If yes, the data conforming to the preset format is the security data. Certainly, it may be determined whether the current data to be displayed contains the security data in other methods. After the main processor determines that the current data to be displayed contains the security data, it is convenient for the main processor to send the security data and the security display address to the control filter module correspondingly.

In embodiments, the control filter module may obtain the current data packet to be displayed in one of the following methods.

In method 1, after the control filter module receives the instruction for starting the security display state, the main processor sends the current data packet to be displayed to the control filter module. The control filter module obtains the current data packet to be displayed sent by the main processor. For example, in a case that the instruction for starting the security display state is the application initialization instruction, after entering the security display state, the current data packet to be displayed sent by the main processor is received.

In method 2, the instruction for starting the security display state received by the control filter module carries the current data packet to be displayed, and the control filter module obtains the current data packet to be displayed from the instruction for starting the security display state. For example, when the instruction for starting the security display state is the signature instruction, the control filter module may obtain the current data packet to be displayed from the signature instruction.

At block S3, in a case that the display address includes the security display address, the control filter module may obtain the security data corresponding to the security display address from the current data to be displayed and send the security data to the security module for securely processing. The security display address is a fixed address.

In embodiments, the security data may be transaction information (for example, a transaction account and/or a transaction amount), or may be other data that needs to be securely displayed, which is not specifically limited in this embodiment.

In embodiments, the security display address is a fixed address. For example, the security display address may be physical addresses of a fixed storage unit. In another example, the security display address may be physical addresses of some fixed storage units. The physical address of each storage unit corresponds to a fixed display region of the display screen. Each security data is stored at the fixed security display address. That is, when the display screen displays the security data, the security data is displayed with the fixed display region of the display screen. It should be noted that after entering the security display state, the security display region of the display screen is only used to display security data or security identification information. The security identification information is used to inform the user that the data displayed in the region where the security identification information is located is the security data (which may be further described below). By displaying the security data in the fixed region of the display screen, it is convenient for the user to confirm that the security data is in the security display state. In addition, in a case that the display address sent by the hacker does not include the security display address, the security module does not sign the security data tampered with by the hacker, thereby achieving "what you see is not what you sign for".

In a specific application, the control filter module and the main processor may determine the fixed security display address through negotiation. Certainly, the control filter module and the main processor may determine the fixed security display address in other methods, which is not specifically limited in embodiments. After the main processor determines that the current data to be displayed includes the security data, the display address sent by the main processor to the control filter module includes the fixed security display address, and the security data is sent to the control filter module at the fixed security display address correspondingly. The security display address received by the control filter module is a fixed address, that is, the fixed region on the display screen displays the security data to be confirmed by the user. By displaying the security data in the fixed region of the display screen, the user can conveniently confirm the data displayed in that region.

As a possible implementation of embodiments, after the block S2 and before the block S3, the method may further include: determining, by the control filter module, whether the display address includes the security display address. If yes, the block S3 is executed; otherwise, the control display module displays the current data to be displayed. In a specific application, in a case of determining by the control filter module that the display address includes the security display address, it indicates that the current data to be displayed includes the security data. The control filter module obtains the security data corresponding to the security display address from the current data to be displayed and sends the security data to the security module for securely processing. In a case of determining by the control filter module that the display address does not include the security display address, it indicates that the current data to be displayed does not include the security data and it does not require to securely display the security data. The current data to be displayed may be directly displayed by the control display module at a non-security display address. The non-security display address is an address included in the display address other than the security display address. By determining whether the security display address is included, the control filter module may determine whether to directly display the current data to be displayed or perform security processing on the security data in the current data to be displayed.

At block S4, the control filter module controls the display module to display the security data at the security display address.

In embodiments, the display module may be a display screen. The display screen may be an LED display screen, or a liquid crystal display screen, which is not specifically limited in this embodiment, as long as it can be used to display the data to be displayed within the protection scope of the present disclosure.

In embodiments, after the control filter module controls the display module to display the security data, the user confirms the displayed security data. After the security module receives confirmation information of the security data, the security module performs the security processing on the security data.

In embodiments, the user may confirm, cancel, or perform other operations on the security data through a physical button provided on the terminal. The physical key for confirming, canceling, or performing other operations may be an existing physical key (such as power key and volume key). Functions of confirming or canceling the security data can be realized by multiplexing the existing physical key, thereby reducing modification of an existing terminal. Certainly, a new physical key can also be provided on the terminal, which is not specifically limited in embodiments.

In embodiments, both the control filter module and the security module may have a function of key detection, which is not specifically limited in embodiments. Both the control filter module and the security module having the function of key detection can detect whether the physical key is pressed. By detecting whether the physical key is pressed, it is possible to determine whether the user confirms, cancels, or performs other operations on the security data.

As a possible implementation of embodiments, when the security display address is a fixed address, the control filter module controls the display module to display the non-security display data at the non-security display address. The non-security display address is an address of the display address other than the security display address. The non-security display data is data in the current data to be displayed other than the security data. That is, in addition to the security data, the display screen may display data in the data to be displayed other than the security data, thereby realizing full use of the display screen.

As a possible implementation of embodiments, after the control filter module obtains the security data corresponding to the security display address, the method may further include: adding, by the control filter module, security identification information to the security data. Controlling, by the control filter module, the display module to display the security data at the security display address may include: controlling, by the control filter module, the display module to display the security data and the security identification information at the security display address. In a specific application, the user is notified by the security identification information that the data displayed in the region where the security identification information is located is the security data, which is convenient for the user to confirm the security data.

At block S5, the control filter module obtains a security processing result of the security data.

In embodiments, the control filter module and the security module may be implemented by the same chip, or may be implemented by individual chips, which are not specifically limited in embodiments.

In embodiments, the security processing result may be a confirmation response, a signature completion response, a cancellation response, or a timeout response. When the security processing result is the confirmation response, the control filter module may obtain the security processing result of the security data in the following methods.

In method 1, the control filter module generates the confirmation response after detecting that a confirmation key is pressed within a preset time.

In method 2, after the security module detects that the confirmation key is pressed within the preset time, the confirmation response is generated by the security module and sent to the control filter module.

In embodiments, in a case that the security processing result is the signature completion response, the control filter module may obtain the security processing result of the security data in the following methods.

In method 1, the control filter module sends the confirmation response to the security module after detecting that the confirmation key is pressed within the preset time. After receiving the confirmation response, the security module performs the signature operation on the security data to generate the signature completion response and send the signature completion response to the control filter module.

In method 2, after detecting that the confirmation key is pressed within the preset time, the security module performs the signature operation on the security data to generates the signature completion response and send the signature completion response to the control filter module.

In embodiments, in a case that the security processing result is the cancellation response, the control filter module may obtain the security processing result of the security data in the following methods.

In method 1, the control filter module generates the cancellation response after detecting that a cancellation key is pressed within a preset time.

In method 2, after detecting that the cancellation key is pressed within the preset time, the security module generates the cancellation response and sends the cancellation response to the control filter module.

In embodiments, in a case that the security processing result is the timeout response, the control filter module may obtain the security processing result of the security data in the following methods.

In method 1, the control filter module generates the timeout response in response to detecting that the confirmation key or the cancellation key is not pressed within a preset time.

In method 2, the security module generates the timeout response and sends the timeout response to the control filter module in respond to detecting that the confirmation key or the cancellation key is not pressed within the preset time.

In the related art, the main processor directly sends the current data to be displayed to the security module or the display module, resulting in that the security data signed by the security module is different from the security data displayed by the display module, i.e., it cannot guarantee "what you see is what you signed for". Embodiments are different from the related art in that the main processor does not directly send the data packet to be displayed to the security module or the display module, but to the control filter module. The control filter module, on one hand, sends the data to be displayed to the security module for securely processing, and on the other hand, controls the display module to display. In this way, even if the hacker attacks the main processor and tampers with the security data and the hacker does not know the fixed address for securely displaying, the display address in the current data packet to be displayed sent by the main processor to the control filter module does not include the security display address such that the security module cannot sign the security data, which solves a technical problem existing in the prior art that "what you see is what you signed for" cannot be guaranteed. In addition, in a case that the hacker attacks the main processor and tampers with the security data and the hacker clearly knows the fixed address for securely displaying, since the security data sent by the control filter module to the security module for securely processing is same to the security data displayed by the control display module and the displayed security data that is tampered by the hacker is incorrect, the user does not confirm the incorrect security data displayed. As long as the user does not confirm the tampered security data, the tampered security data cannot be signed, which also solves the technical problem existing in the prior art that "what you see is what you signed for" cannot be guaranteed.

In embodiments, the main processor directly communicates with the control filter module, and the technical problem that "what you see is not what you signed for" since the main processor directly communicates with the security module or the display module in the related art is solved. However, in embodiments, after obtaining the current data packet to be displayed, the control filter module performs the display operation and the security processing operation on the security data in the current data packet to be displayed in blocks S2-S5. The main processor may send a next data packet to be displayed to the control filter module at any time when the control filter module executes the blocks S2-S5. The next data packet to be displayed may be a data packet generated based on the security data tampered by the hacker. In a case that next data to be displayed in the next data packet to be displayed is directly displayed, it is possible that the security data signed by the security module is not the security data displayed by the display module, and "what you see is what you signed for" cannot be guaranteed.

In order to further solve the technical problem that "what you see is not what you signed for" caused by receiving the next data packet to be displayed, the method may be specifically implemented as follows.

In method 1, after acquiring the current data packet to be displayed and before obtaining the security processing result of the security data, the method further includes, disabling, by the control filter module, a function of receiving the next data packet to be displayed; and enabling, by the control filter module, the function of receiving the next data packet to b e displayed after obtaining the security processing result of the security data.

In a specific application, the control filter module may disable or enable the function of receiving the next data packet to be displayed by closing or opening an I/O port of the control filter module. In a case that the main processor sends the next data packet to be displayed to the control filter module during executing, by the control filter module, the blocks S2-S5, the control filter module refuses to receive the next data packet to be displayed by disabling the function of receiving the next data packet to be displayed. After obtaining the security processing result of the security data, the function of receiving the next data packet to be displayed is enabled. It can be seen that with this method, it is impossible to receive the next data packet to be displayed containing data tampered by the hacker before the security data in the current data packet to be displayed is signed. Therefore, it is impossible to sign the tampered security data. In this way, the security data displayed by the display module is the security data signed by the security module, and thus "what you see is what you signed for" can be guaranteed.

In method 2, before the control filter module obtains the security processing result of the security data, the method further includes: receiving, by the control filter module, the next data packet to be displayed. The next data packet to be displayed at least includes the next display address and the next data to be displayed corresponding to the next display address. In addition, the method further includes: determining whether the next address to be displayed contains the security display address. In a case that the next address to be displayed contains the security display address, the next data packet to be displayed is discarded or the next security data corresponding to the security display address is obtained from the next data to be displayed after the security processing result is received. In a case that the next address to be displayed does not include the security display address, the display module is controlled to display the next data to be displayed.

In a specific application, in a case that the main processor sends the next data packet to be displayed to the control filter module within the time that the control filter module executes the blocks S2-S5, the control filter module receives the next data packet to be displayed before obtaining the security processing result. After receiving the next data packet to be displayed, it is determined whether the next address to be displayed includes the security display address. If yes, it indicates that the next data to be displayed also includes the next security data, and the next security data may be tampered by the hacker. To prevent a problem that "what you see is not what you signed for", the control filter module may directly discard the next data packet to be displayed. In this way, it is impossible to sign the received security data that is tampered by the hacker before signing the security data in the current data packet to be displayed. Therefore, the security data displayed by the display module is the security data signed by the security module, which guarantees that "what you see is what you signed for". In another example, after the control filter module receives the security processing result, the next security data corresponding to the security display address is obtained from the next data to be displayed. In a case that the control filter module receives the security processing result, it indicates that the control filter module completes processing the current data packet to be displayed. Because the next security data is not obtained from the next data to be displayed during processing the current data pack to be displayed, the data signed by the security module is not the next security data, and thus "what you see is what you signed for" can be guaranteed.

In a specific application, in a case that the next address to be displayed does not include the security display address, it indicates that the next data to be displayed does not include the security data and it does not require to securely display the data. The control filter module directly controls the display module to display the next data to be displayed at the non-security display address.

With the method for securely displaying data according to embodiments, the main processor communicates directly with the control filter module, and the security data is displayed at the fixed security display address, thereby solving the technical problem that "what you see is not what you signed for" since the main processor directly communicates with the security module or the display module in the related art. In addition, by directly discarding the next data after receiving the next data packet to be displayed, the problem that "what you see is not what you signed for" caused by receiving the next data packet to be displayed is solved. In another example, after receiving the security processing result of the security data in the current data to be displayed, the next security data is obtained from the next data to be displayed to resolve the problem that "what you see is not what you signed for" caused by receiving the next data packet to be displayed. In another example, the control filter module disables the function of receiving the next data packet to be displayed after the current data packet to be displayed is obtained, and enables the function of receiving the next data packet to be displayed after the security processing result of the security data is obtained, which also solves the technical problem of "what you see is not what you signed for" caused by receiving the next data packet to be displayed.

Figure 2:
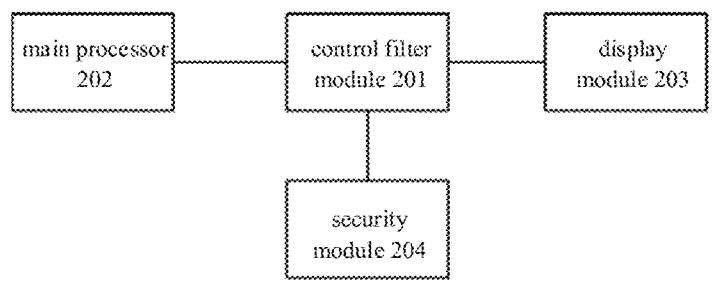
FIG. 2 is a block diagram illustrating a device for securely displaying data according to embodiments of the present disclosure.

FIG. 2 is a block diagram illustrating a device for securely displaying data according to embodiments of the present disclosure. As illustrated in FIG. 2, the device at least includes: a control filter module 201, a main processor 202, a display module 203 and a security module 204. The control filter module 201 is configured to enter a security display state after receiving an instruction for starting the security display state. The control filter module 201 is configured to obtain a current data packet to be displayed. The current data packet to be displayed at least includes a display address and current data to be displayed corresponding to the display address. The control filter module 201 is further configured to obtain security data corresponding to the security display address from the current data to be displayed in a case that the display address includes the security display address, and send the security data to the security module 204. The security display address is a fixed address. The control filter module 201 is further configured to control the display module 203 to display the security data at the security display address. The security data is used to a signature operation of the security module 204 after the security module 204 receives a confirmation instruction of the security data. Furthermore, the control filter module 201 is further configured to obtain a security processing result for the security data.

In embodiments, the instruction for starting the security display state may be an application initialization instruction. For example, the security display state is started when launching the application program. In embodiments, the instruction for starting the security display state may be a signature instruction. For example, the security display state is started after receiving the signature instruction. In embodiments, the instruction for starting the security display state may be an instruction to prepare a secure computing environment. Certainly, any instruction in an instruction stream before the security data (e.g., transaction account or transaction amount) is securely processed (e.g., signed) may be used as an instruction for starting the security display state, which is not specifically limited in embodiments, as long as the instruction for starting the security display state is within the protection scope of the present disclosure.

The device in embodiments may be a terminal (for example, a personal computer, a mobile phone, an IPAD), and the like. Unlike an existing terminal, the main processor 202 in embodiments does not directly communicate with the security module 204 and the display module 203, but directly with the control filter module 201.

In embodiments, the control filter module 201 may be integrated in a graphics card or an image processing chip (GPU) of the terminal. Certainly, the function of the control filter module 201 may be implemented by a separate chip, or by integrating with the security module 204 on a same chip, which is not limited in embodiments, as long as the implementations of the function of the control filter module 201 in embodiments is within the protection scope of the present disclosure.

In embodiments, the display address is a physical address of the storage unit. The data to be displayed on the display screen needs to be stored by the storage unit. The current data to be displayed corresponding to the display address is stored in the storage unit at the display address. It should be noted that the storage unit may b e a separate storage unit of the graphics card, or a storage unit shared with the main processor 202. In an example, a part of the storage unit is in a video memory, and the other part of the storage unit is shared with the main processor 202, which is not specifically limited in embodiments.

As a possible implementation of embodiments, the main processor 202 is configured to determine whether the current data packet to be displayed includes the security data. In specific applications, the main processor 202 may determine whether the data to be displayed contains data conforming to a preset format. If yes, the data conforming to the preset format is the security data. Certainly, it may be determined whether the current data to be displayed includes the security data in other methods. After the main processor 202 determines that the security data is included, it is convenient for the main processor 202 to send the security data and the security display address to the control filter module 201 correspondingly.

In embodiments, the control filter module 201 may obtain the current data packet to be displayed in one of the following methods.

In method 1, after the control filter module 201 receives the instruction for starting the security display state, the main processor 202 sends the current data packet to be displayed to the control filter module 201. The control filter module 201 obtains the current data packet to be displayed sent by the main processor 202. For example, in a case that the instruction for starting the security display state is the application initialization instruction, the current data packet to be displayed sent by the main processor 202 is received after entering the security display state.

In method 2, the instruction for starting the security state received by the control filter module 201 carries the current data packet to be displayed, and the control filter module 201 obtains the current data packet to be displayed from the instruction for starting the security state. For example, when the instruction for starting the security display state is the signature instruction, the control filter module 201 may obtain the data packet to be displayed from the signature instruction.

In embodiments, the security data may be transaction information (for example, a transaction account and/or a transaction amount), or may be other data that needs to be securely displayed, which is not specifically limited in this embodiment.

In embodiments, the security display address is a fixed address. For example, the security display address may be physical addresses of a fixed storage unit. In another example, the security display address may be physical addresses of some fixed storage units. The physical address of each storage unit corresponds to a fixed display region of the display screen. Each security data is stored at the fixed security display address. That is, when the display screen displays the security data, the security data is displayed within the fixed display region of the display screen. It should be noted that after entering the security display state, the security display region of the display screen is only used to display security data or security identification information. The security identification information is used to inform the user that the data displayed in the region where the security identification information is located is the security data (which may be further described below). By displaying the security data in the fixed region of the display screen, it is convenient for the user to confirm that the security data is in the security display state. In addition, in a case that the display address sent by the hacker does not include the security display address, the security module does not sign the security data tampered with by the hacker, thereby achieving "what you see is not what you sign for".

In a specific application, the control filter module 201 and the main processor 202 may determine the fixed security display address through negotiation. Certainly, the control filter module 201 and the main processor 202 may determine the fixed security display address in other methods, which is not specifically limited in embodiments. After the main processor 202 determines that the current data to be displayed includes the security data, the display address sent by the main processor 202 to the control filter module 201 includes the fixed security display address, and the security data is sent to the control filter module 201 at the fixed security display address correspondingly. The security display address received by the control filter module 201 is the fixed address, that is, the fixed region on the display screen displays the security data to be confirmed by the user. By displaying the security data in the fixed region of the display screen, the user can conveniently confirm the data in that region.

As a possible implementation of embodiments, the control filter module 201 determines whether the display address includes the security display address. In a specific application, in a case that the control filter module 201 determines that the display address includes the security display address, it indicates that the current data to be displayed includes the security data. The control filter module 201 obtains the security data corresponding to the security display address from the current data to be displayed and sends the security data sent to the security module 204 for securely processing. In a case that the control filter module 201 determines that the display address does not include the security display address, it indicates that the current data to be displayed does not include the security data and it does not require to securely display the data. The control display module 203 directly displays the current data to be displayed at the non-security display address. The non-security display address is an address included in the display address other than the security display address. By determining whether the security display address is included, the control filter module 201 can determine whether to directly display the current data to be displayed or to perform security processing on the security data in the current data to be displayed.

In embodiments, the display module 203 may be a display screen. The display screen may be an LED display screen, or a liquid crystal display screen, which is not specifically limited in embodiments, as long as it can be used to display the data to be displayed within the protection scope of the present disclosure.

In embodiments, after the control filter module 201 controls the display module 203 to display the security data, the user confirms the displayed security data. After the security module 204 receives confirmation information of the security data, the security module 204 performs the security processing on the security data.

In embodiments, the user may confirm, cancel, or perform other operations on the security data through a physical key provided on the terminal. The physical key for confirming, canceling, or performing other operations may be an existing physical key (such as power key, and volume key). Functions of confirming or canceling the security data can be realized by multiplexing the existing physical key, thereby reducing modification of an existing terminal. Certainly, a new physical key can also be provided on the terminal, which is not specifically limited in embodiments.

In embodiments, both the control filter module 201 and the security module 204 may have a function of key detection, which is not specifically limited in embodiments. The control filter module 201 and the security module 204 having the function of key detection can detect whether the physical key is pressed. By detecting whether the physical key is pressed, it may be determined whether the user confirms, cancels, or performs other operations on the security data.

As a possible implementation of embodiments, when the security display address is a fixed address, the control filter module 201 is further configured to control the display module 203 to display non-security display data at the non-security display address. The non-security display address is an address of the display address other than the security display address, and the non-security display data is data of the current data to be displayed other than the security data. That is, in addition to the security data, the display screen also displays the data included in the data to be displayed other than the security data, thereby realizing full use of the display screen.

As a possible implementation of embodiments, the control filter module 201 is further configured to add security identification information to the security data after obtaining the security data corresponding to the security display address and control the display module 203 to display the security display data and the security identification information at the security display address. In a specific application, the user is notified by the security identification information that the data displayed in the region where the security identification information is located is the security data, which is convenient for the user to confirm the security data.

In embodiments, the control filter module 201 and the security module 204 may be implemented by a same chip, or may be implemented by individual chips, which is not specifically limited in embodiments.

In embodiments, the security processing result may be a confirmation response, a signature completion response, a cancellation response, or a timeout response.

In embodiments, in a case that the security processing result is the confirmation response, the control filtering module 201 may obtain the security processing result of the security data in the following methods.

In method 1, the control filter module 201 generates the confirmation response after detecting that a confirmation key is pressed within a preset time.

In method 2, after the security module 204 detects that the confirmation key is pressed within the preset time, the confirmation response is generated by the security module 204 and sent to the control filter module 201.

In embodiments, in a case that the security processing result is the signature completion response, the control filter module 201 can obtain the security processing result of the security data in the following methods.

In method 1, the control filter module 201 sends the confirmation response to the security module 204 after detecting that the confirmation key is pressed within the preset time. After receiving the confirmation response, the security module 204 performs the signature operation on the security data to generate the signature completion response and send the signature completion response to the control filter module 201.

In method 2, after detecting that the confirmation key is pressed within the preset time, the security module 204 performs the signature operation on the security data to generate the signature completion response and send the signature completion response to the control filter module 201.

In embodiments, in a case that the security processing result is the cancellation response, the control filter module 201 may obtain the security processing result of the security data in the following methods.

In method 1, the control filter module 201 generates the cancellation response in response to detecting that a cancellation key is pressed within a preset time.

In method 2, the security module 204 generates the cancellation response and sends the cancellation response to the control filter module 201 in response to detecting that the cancellation key is pressed within the preset time.

In embodiments, in a case that the security processing result is the timeout response, the control filter module 201 may obtain the security processing result of the security data in the following methods.

The control filter module 201 generates the timeout response in response to detecting that the confirmation key or the cancellation key is not pressed within a preset time.

The security module 204 generates the timeout response, and sends the timeout response to the control filter module 201 in response to detecting that the confirmation key or the cancellation key is not pressed within the preset time.

In the related art, the main processor 202 directly sends the current data to be displayed to the security module 204 or the display module 203, resulting in that the security data signed by the security module 204 is different from the security data displayed by the display module 203, and thus "what you see is what you signed for" cannot be guaranteed. Embodiments are different from the related art in that the main processor 202 does not directly send the data packet to be displayed to the security module 204 or the display module 203, but to the control filter module 201. The control filter module 201 sends the data to be displayed, on one hand, to the security module 204 for securely processing, and, on the other hand, controls the display module 203 for displaying. In this way, even if the hacker attacks the main processor 202 and tampers with the security data, in a case that the attacker does not know the fixed address for securely displaying, the display address in the current data packet to be displayed sent by the main processor 202 to the control filter module 201 does not include the security display address, and thus the security module 204 cannot sign the security data, which solves the technical problem existing in the prior art that "what you see is what you signed for" cannot be guaranteed. In addition, even if the hacker attacks the main processor and tampers with the security data, in a case that the hacker clearly knows the fixed address for securely displaying, and the security data sent by the control filter module 201 to the security module 204 for securely processing is same to the security data displayed by the control display module 201, since the displayed security data that is tampered by the hacker is incorrect, the user does not confirm the incorrect security data. As long as the user does not confirm the tampered security data, the tampered security data is not signed, which also solves the technical problem existing in the prior art that "what you see is what you signed for" cannot be guaranteed.

In embodiments, the main processor 202 directly communicates with the control filter module 201 to solve the technical problem existing in the related art that "what you see is not what you signed for" caused by directly communicating between the main processor 202 and the security module 204 or the display module 203. However, in embodiments, after obtaining the current data packet to be displayed, the control filter module 201 performs the display operation and the security processing operation on the security data in the current data packet to be displayed. The main processor 202 may send the next data packet to be displayed to the control filter module 201 at any time when the control filter module 201 performs the displaying operation and the security processing operation. The next data packet to be displayed may be a data packet generated after the security data tampered by the hacker. In a case that the next data to be displayed in the next data packet to be displayed is directly displayed, the security data signed by the security module 204 may not be the security data displayed by the display module 203, and thus "what you see is what you signed for" cannot be guaranteed.

In order to further solve the technical problem that "what you see is not what you signed for" caused by receiving the next data packet to be displayed, the method may be specifically implemented as follows.

In method 1, after the current data packet to be displayed is obtained and before the security processing result of the security data is obtained, the control filter module 201 is further configured to disable a function of receiving the next data packet to be displayed. In addition, the control filter module 201 is further configured to enable the function of receiving the next data packet to be displayed after the security processing result of the security data is obtained.

In a specific application, the control filter module 201 may be configured to disable or enable the function of receiving the next data packet to be displayed by closing or opening an I/O port of the control filter module 201. In a case that the main processor 202 sends the next data packet to be displayed to the control filter module 201 during processing, by the control filter module, the current data package to be displayed, the control filter module 201 may refuse to receive the next data packet to be displayed by disabling the function of receiving the next data to be displayed. After the security processing result of the security data is obtained, the function of receiving the next data packet to be displayed may be enabled. In this way, it is impossible to receive the next data packet to be displayed containing data tampered by the hacker before the security data in the current data packet to be displayed is signed, and it is impossible to sign the tampered security data. In this way, the security data displayed by the display module 203 is the security data signed by the security module 204, thereby allowing "what you see is what you signed for".

In method 2, the control filter module 201 is configured to receive the next data packet to be displayed. The next data packet to be displayed at least includes the next display address and the next data to be displayed corresponding to the next display address. In addition, the control filter module 201 is further configured to determine whether the next address to be displayed contains the security display address. In a case that the next address to be displayed contains the security display address, the control filter module 201 is further configured to discard the next data packet to be displayed or obtain the next security data corresponding to the security display address from the next data to be displayed after the security processing result is received. In a case that the next address to be displayed does not include the security display address, the control display module 201 may be configured to control the display module 203 to display the next data to be displayed.

In a specific application, in a case that the main processor 202 sends the next data packet to be displayed to the control filter module 201 during processing, by the control filter module 201, the current data package to be displayed, the control filter module 201 is configured to receive the next data packet to be displayed before obtaining the security processing result, and to determine whether the next address to be displayed includes the security display address, after receiving the next data packet to be displayed. If yes, it indicates that the next data to be displayed includes the next security data. The next security data may be tampered by the hacker. To prevent the problem that "what you see is not what you signed for", the control filter module 201 is configured to directly discard the received next data packet to be displayed. In this way, it is impossible to sign the received security data that is tampered by the hacker before the security data in the current data packet to be displayed is signed. The security data tampered by the hacker is the security data signed by the security module 204, which guarantees that "what you see is what you signed for". In another example, after the control filter module 201 receives the security processing result, the next security data corresponding to the security display address is obtained from the next data to be displayed. Receiving, by the control filter module 201, the security processing result indicates that the control filter module 201 completes processing the current data packet to be displayed. Because the next security data is not obtained from the next data to be displayed during processing the current data pack to be displayed, the data signed by the security module is not the next security data, and thus "what you see is what you signed for" can be guaranteed.

In a specific application, in a case that the next address to be displayed does not include the security display address, it indicates that the next data to be displayed does not include the security data and it does not require to securely display the data. The control filter module 201 is configured to directly control the display module 203 to display the next data to be displayed at the non-security display address.

With the device for securely displaying data according to embodiments, the main processor 202 communicates directly with the control filter module 201, and the security data is displayed at the fixed security display address, thereby solving the technical problem that "what you see is not what you signed for" caused by directly communicating, by the main processor 202, with the security module 204 or the display module 203 in the related art. In addition, by directly discarding the next data after receiving the next data packet to be displayed, the problem that "what you see is not what you signed for" caused by receiving the next data packet to be displayed is solved. In another example, after the security processing result of the security data in the current data to be displayed is received, the next security data is obtained from the next data to be displayed to resolve the problem that "what you see is not what you signed for" caused by receiving the next data packet to be displayed. In another example, the control filter module 201 disables the function of receiving the next data packet to be displayed after the current data packet to be displayed is obtained, and enables the function of receiving the next data packet to be displayed after the security processing result of the secure data is obtained, which also solves the technical problem that "what you see is not what you signed for" caused by receiving the next data packet to be displayed.

What is claimed is:

1. A method for securely displaying data, comprising:
    entering a security display state after receiving an instruction for starting the security display state;
        obtaining a current data packet to be displayed, wherein the current data packet to be displayed at least comprises display address and current data to be displayed corresponding to the display address;
        in a case that the display address comprises a security display address, obtaining security data corresponding to the security display address from the current data to be displayed and securely processing the security data, the security display address being a fixed address;
        controlling to display the security data at the security display address; and
        obtaining a security processing result of the security data.

2. The method according to claim 1, comprising:
    disabling a function of receiving a next data packet to be displayed after obtaining the current data packet to be displayed and before obtaining the security processing result of the security data; and
    enabling the function of receiving the next data packet to be displayed after obtaining the security processing result of the security data.

3. The method according to claim 1, comprising:
    before obtaining the security processing result of the security data, receiving a next data packet to be displayed, the next data packet to be displayed at least comprising a next display address and next data to be displayed corresponding to the next display address, and determining whether a next address to be displayed comprises the security display address;
    in a case that the next address to be displayed comprises the security display address, discarding the next data packet to be displayed or obtaining next security data corresponding to the security display address after receiving the security processing result; and
    in a case that the next address to be displayed does not comprise the security display address, controlling to display the next data to be displayed.

4. The method according to claim 1, further comprising:
    controlling to display non-security display data at a non-security display address, the non-security display address being an address of the display address other than the security display address, and the non-security display data being data of the current data to be displayed other than the security data.

5. The method according to claim 1, further comprising:
adding security identification information to the security data after obtaining the security data corresponding to the security display address; and
controlling to display the security data at the security display address comprising: controlling to display the security data and the security identification information at the security display address.

6. A device for securely displaying data, comprising:
a processor, and
a memory, configured to store instructions executable by the processor,
wherein when the instructions stored in the memory are executed by the processor, the processor is configured to:
enter a security display state after receiving an instruction for starting the security display state;
obtain a current data packet to be displayed, the current data packet to be displayed at least comprising a display address and current data to be displayed corresponding to the display address; and
obtain security data corresponding to the security display address from the current data to be displayed in a case that the display address comprises the security display address, securely processing the security data, the security display address being a fixed address; control to display the security data at the security display address, the security data being used for a signature operation of the security data after a confirmation instruction of the security data is received; and obtain a security processing result of the security data.

7. The device according to claim 6, wherein the processor is further configured to disable a function of receiving a next data packet to be displayed after obtaining the current data packet to be displayed and before obtaining the security processing result of the security data; and
enable the function of receiving the next data packet to be displayed after obtaining the security processing result of the security data.

8. The device according to claim 6, wherein the processor is further configured to receive a next data packet to be displayed, the next data packet to be displayed at least comprising a next display address and next data to be displayed corresponding to the next display address, and determine whether the next address to be displayed comprises the security display address;
in a case that the next address to be displayed comprises the security display address, discard the next data packet to be displayed or obtain next security data corresponding to the security display address from the next data to be displayed after receiving the security processing result; and
in a case that the next address to be displayed does not comprise the security display address, control to display the next data to be displayed.

9. The device according to claim 6, wherein the processor is further configured to control to display non-security display data at a non-security display address, the non-security display address being an address of the display address other than the security display address, and the non-security display data being data of the current data to be displayed other than the security data.

10. The device according to claim 6, wherein the processor is further configured to add security identification information to the security data after obtaining the security data corresponding to the security display address, and control to display the security data and the security identification information at the security display address.

11. A non-transitory computer readable storage medium, having instructions stored thereon, wherein when the instructions are executed by a processor, a method for securely displaying data is executed, the method comprising:
entering a security display state after receiving an instruction for starting the security display state;
obtaining a current data packet to be displayed, wherein the current data packet to be displayed at least comprises a display address and current data to be displayed corresponding to the display address;
in a case that the display address comprises a security display address, obtaining security data corresponding to the security display address from the current data to be displayed and securely processing the security data, the security display address being a fixed address;
controlling to display the security data at the security display address; and
obtaining a security processing result of the security data.

12. The non-transitory computer readable storage medium according to claim 11, wherein the method further comprises:
disabling a function of receiving a next data packet to be displayed after obtaining the current data packet to be displayed and before obtaining the security processing result of the security data; and
enabling the function of receiving the next data packet to be displayed after obtaining the security processing result of the security data.

13. The non-transitory computer readable storage medium according to claim 11, wherein the method further comprises:
before obtaining the security processing result of the security data, receiving a next data packet to be displayed, the next data packet to be displayed at least comprising a next display address and next data to be displayed corresponding to the next display address, and determining whether a next address to be displayed comprises the security display address;
in a case that the next address to be displayed comprises the security display address, discarding the next data packet to be displayed or obtaining next security data corresponding to the security display address after receiving the security processing result; and
in a case that the next address to be displayed does not comprise the security display address, controlling to display the next data to be displayed.

14. The non-transitory computer readable storage medium according to claim 11, wherein the method further comprises:
controlling to display non-security display data at a non-security display address, the non-security display address being an address of the display address other than the security display address, and the non-security display data being data of the current data to be displayed other than the security data.

15. The non-transitory computer readable storage medium according to claim 11, wherein the method further comprises:

adding security identification information to the security data after obtaining the security data corresponding to the security display address; and controlling to display the security data at the security display address comprising: controlling to display the security data and the security identification information at the security display address.

* * * * *